(12) United States Patent
Tyan et al.

(10) Patent No.: US 7,725,035 B2
(45) Date of Patent: May 25, 2010

(54) METHOD AND SYSTEM FOR MANAGING NETWORK TRAFFIC

(75) Inventors: Hung-ying Tyan, San Jose, CA (US); Ching-Fong Su, Milpitas, CA (US)

(73) Assignee: Fujitsu Limited, Kawasaki (JP)

( * ) Notice: Subject to any disclaimer, the term of this patent is extended or adjusted under 35 U.S.C. 154(b) by 789 days.

(21) Appl. No.: 10/828,570

(22) Filed: Apr. 20, 2004

(65) Prior Publication Data

US 2005/0232157 A1    Oct. 20, 2005

(51) Int. Cl.
  *H04B 10/00*    (2006.01)
  *H04J 14/00*    (2006.01)
  *H04L 12/26*    (2006.01)
(52) U.S. Cl. .......................... 398/115; 398/49; 398/50; 370/237; 370/229
(58) Field of Classification Search ................... 398/49, 398/7, 50, 115; 370/237–239, 389, 400
See application file for complete search history.

(56) References Cited

U.S. PATENT DOCUMENTS

| 6,882,627 | B2* | 4/2005 | Pieda et al. ................. 370/248 |
| 2003/0043745 | A1* | 3/2003 | Kano et al. ................. 370/238 |
| 2003/0117678 | A1* | 6/2003 | Chang et al. ................ 359/157 |
| 2003/0179716 | A1* | 9/2003 | Liu ............................ 370/254 |
| 2006/0209785 | A1* | 9/2006 | Iovanna et al. .............. 370/351 |

OTHER PUBLICATIONS

Ma, et al, "*On Path Selection for Traffic with Bandwidth Guarantees*", IEEE publication, 0-8186-8061-X/97, pp. 191-202, 1997.
Wang, et al, "*Explicit Routing Algorithms for Internet Traffic Engineering*", IEEE publication, 0-7803-5794-9/1999, pp. 582-588, 1999.
Cinkler, et al, *Heuristic Algorithms for Joint Configuration of the Optical and Electrical Layer in Multi-Hop Wavelength Routing Networks*, INFOCOM 2000, pp. 1-10, 2000.
Saito, et al, "*Traffic Engineering Using Multiple Multipoint-to-Point LSPs*", Proceedings of INFOCOM '2000, 8 pages, 2000.
Kodialam, et al, "*Integrated Dynamic IP and Wavelength Routing in IP over WDM Networks*", Proceedings of IEEE INFOCOM, 9 pages, Apr. 2001.

(Continued)

*Primary Examiner*—Quan-Zhen Wang
(74) *Attorney, Agent, or Firm*—Baker Botts L.L.P.

(57) ABSTRACT

A method for managing network traffic includes provisioning an internet protocol (IP) network for communicating traffic. The IP network comprises a plurality of nodes coupled by IP links. The method includes monitoring the IP network for a congestion event and, upon detecting a congestion event, selecting a label switched path (LSP) of the IP network for reroute. The method includes computing a hybrid path route for the selected LSP between a first node and a second node of the plurality of nodes. The hybrid path route comprises at least one lightpath of a wavelength division multiplex (WDM) topology coupled to the IP network. The method also includes determining whether performance of the hybrid path route for the selected LSP reduces costs and, if the hybrid path route reduces costs, activating a new IP link on each of the at least one lightpaths of the WDM topology and rerouting the selected LSP according to the hybrid path route.

29 Claims, 2 Drawing Sheets

OTHER PUBLICATIONS

Wang, et al, "*Internet Traffic Engineering without Full Mesh Overlaying*", Proceedings of INFOCOM '2001, Anchorage, Alaska, 7 pages, Apr. 2001.

Yamanaka, et al, "*Multi-layer Traffic Engineering in Photonic-GMPLS-Router Networks*", IEIECE PS 2002, 5 pages, Apr. 2002.

Acharya, et al, "*Architecting Self-Tuning Optical Networks*", Proceedings of the European Conference of Optical Communications, Copenhagen, 2 pages, Sep. 2002.

Sridharan, et al, *Achieving Near-Optimal Traffic Engineering Solutions for Current OSPF/IS-IS Networks*, Proceedings of IEEE INFOCOM 2003, San Francisco, California, 11 pages, Apr. 2003.

Acharya, et al, "*IP-Subnet Aware Routing in WDM Mesh Networks*", Proceedings of IEEE Infocom, San Francisco, 11 pages, Apr. 2003.

Gouveia, et al, "*MPLS Over WDM Network Design with Packet Level QoS Constraints Based on ILP Models*", Proceedings of IEEE INFOCOM 2003, 11 pages, 2003.

Iovanna, et al, "*A Traffic Engineering System for Multilayer Networks Based on the GMPLS Paradigm*", IEEE Network, pp. 28-37, Mar.-Apr. 2003.

Hung-ying Tyan, et al, *Application-Driven Internet Traffic Analysis*, Proceedings of IEEE GLOBECOM 2003, 5 pages, 2003.

Awduche, et al., *Requirements for Traffic Engineering over MPLS*, IETF RFC 2702, 29 pages, Sep. 1999.

* cited by examiner

U.S. 7,725,035 B2

METHOD AND SYSTEM FOR MANAGING NETWORK TRAFFIC

TECHNICAL FIELD OF THE INVENTION

The present invention relates generally to communication networks and, more particularly, to a method and system for managing network traffic.

BACKGROUND OF THE INVENTION

Traffic engineering includes communication network management tasks that improve the efficiency of network resources, ensure quality of service of application traffic and enhance the reliability of network operation. Traffic engineering in an internet protocol network can be carried out through techniques such as topology design, load-balancing and traffic re-routing. Some traffic engineering solutions for internet protocol networks are designed to meet quality of service requirements of network traffic. Thus, the focus of these solutions has been on dealing with network congestion and link overload.

SUMMARY OF THE INVENTION

The present invention provides a method and system for managing network traffic that substantially eliminates or reduces at least some of the disadvantages and problems associated with previous methods and systems.

According to a particular embodiment, a method for managing network traffic includes provisioning an internet protocol (IP) network for communicating traffic. The IP network comprises a plurality of nodes coupled by IP links. The method includes monitoring the IP network for a congestion event and, upon detecting a congestion event, selecting a label switched path (LSP) of the IP network for reroute. The method includes computing a hybrid path route for the selected LSP between a first node and a second node of the plurality of nodes. The hybrid path route comprises at least one lightpath of a wavelength division multiplex (WDM) topology coupled to the IP network. The method also includes determining whether performance of the hybrid path route for the selected LSP reduces costs and, if the hybrid path route reduces costs, activating a new IP link on each of the at least one lightpaths of the WDM topology and rerouting the selected LSP according to the hybrid path route.

The method may further comprise decommissioning an idle IP link after rerouting the selected LSP. The method may also further comprise receiving a transformed topology constructed by an optical transport service provider of the WDM topology, wherein the transformed topology comprises a subset of available lightpaths of the WDM topology. The hybrid path may be computed based on the transformed topology. Determining whether performance of the hybrid path route for the selected LSP reduces costs may comprise accounting for a cost associated with each IP link and each lightpath of the hybrid path route. Activating a new IP link on each of the at least one lightpaths of the WDM topology may comprise allocating an unused router port on each end of each of the at least one lightpaths and activating the allocated router ports with respective established lightpaths. Each of the plurality of nodes of the IP network may comprise an IP router, and each of the lightpaths of the WDM topology may couple optical crossconnects of the WDM topology. The hybrid path route may also comprise at least one IP link.

In accordance with another embodiment, a system for managing network traffic includes an IP network for communicating traffic. The IP network comprises a plurality of nodes coupled by IP links. The system includes a WDM topology coupled to the IP network. The WDM topology comprises a plurality of lightpaths operable to communicate optical traffic. The system also includes a controller operable to: provision the IP network for communicating traffic; monitor the IP network for a congestion event; upon detecting a congestion event, select a label switched path (LSP) of the IP network for reroute; and compute a hybrid path route for the selected LSP between a first node and a second node of the plurality of nodes. The hybrid path route comprises at least one of the plurality of lightpaths of the WDM topology. The controller is also operable to determine whether performance of the hybrid path route for the selected LSP reduces costs and, if the hybrid path route reduces costs, activate a new IP link on each of the at least one lightpaths of the plurality of lightpaths of the WDM topology and reroute the selected LSP according to the hybrid path route.

The controller may be further operable to decommission an idle IP link after rerouting the selected LSP. The controller may also be further operable to receive a transformed topology constructed by an optical transport service provider of the WDM topology, wherein the transformed topology comprises a subset of available lightpaths of the WDM topology. The hybrid path may be computed based on the transformed topology.

Technical advantages of particular embodiments include the computation of a hybrid path for a LSP in the event of network congestion. The hybrid path may include existing IP links as well as candidate links comprising lightpaths of a WDM topology. An IP topology is overlayed with the WDM topology such that only a representative of the WDM topology is revealed to an internet service provider for making traffic engineering and management decisions. Thus, when managing IP traffic, the internet service provider may not have to be concerned with details of the entire WDM topology or optical traffic engineering decisions. Instead, the internet service provider may only receive a topology indicating WDM links negotiated and available for use by an optical transport service provider. Accordingly, reroute calculation costs may be reduced. Particular embodiments also allow for dynamic network provisioning thus reducing the significance and weight placed upon initial network planning. In addition, revenue for optical transport service providers may be increased since particular embodiments allow optical transport service providers to accommodate more customers with the same amount of resources.

Other technical advantages of the present invention will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
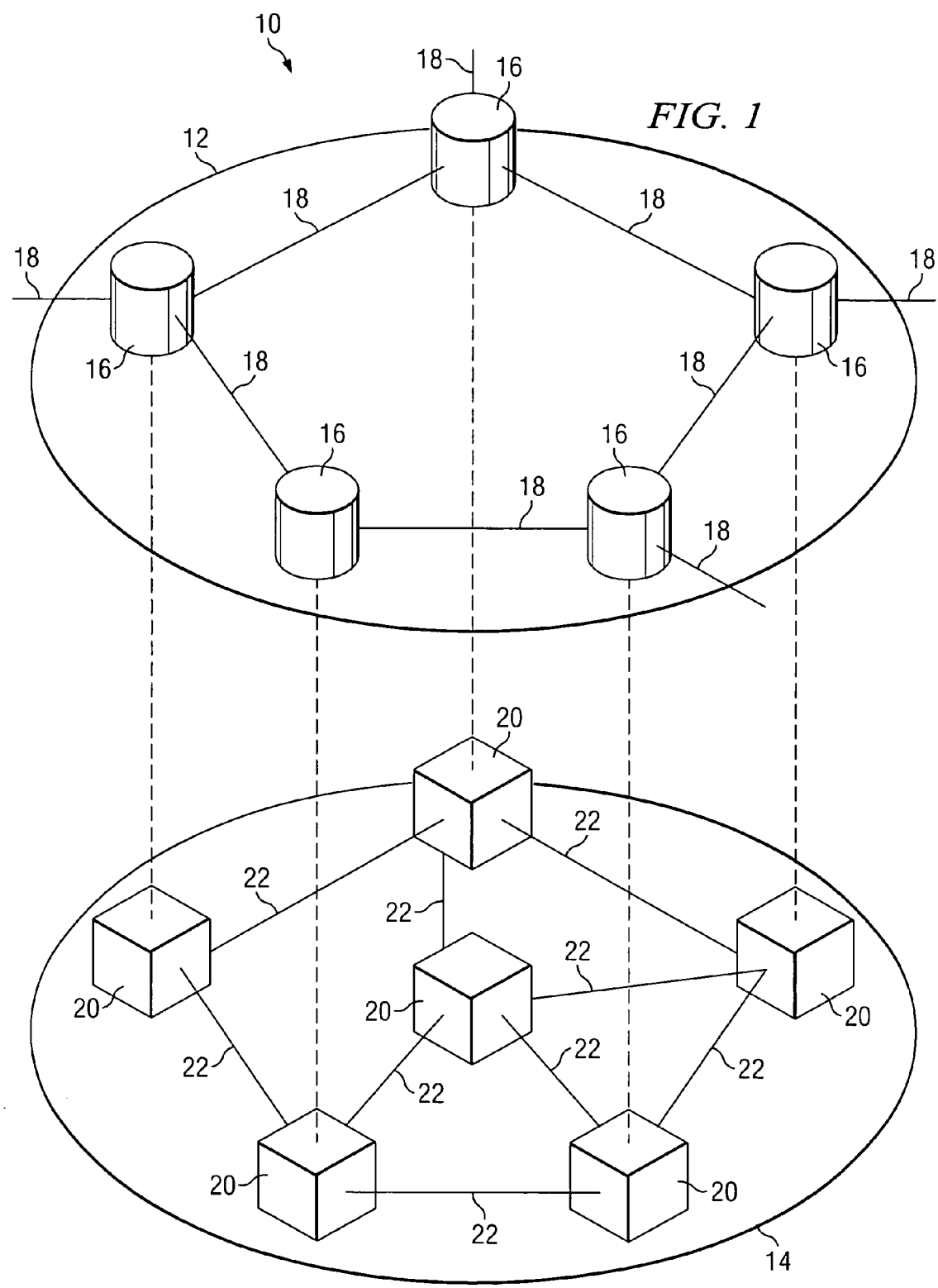
FIG. 1 illustrates a system for managing internet protocol (IP) traffic, in accordance with a particular embodiment of the present invention.

FIG. 1 is a system 10 for managing internet protocol (IP) traffic, in accordance with a particular embodiment of the present invention. System 10 includes an IP network 12 and an optical network 14. IP network 12 provides for the communication of data through any form and/or combination of point-to-point, multicast, unicast or other techniques. IP network 12 includes routers 16 which act as nodes through which data is communicated over IP links 18. IP network 12 may include any number of routers 16 arranged in any suitable manner.

Optical network 14 provides lightpath services for the communication of data through the network. Optical network 14 comprises a wavelength division multiplex (WDM) network in which a number of optical channels are communicated over a common path by modulating the channels by wavelength. Optical network 14 may utilize any suitable multiplexing operation, and a channel may represent any suitable separation of available bandwidth. Optical network 14 includes optical crossconnects (OXCs) 20, optical links 22 and other WDM transport equipment. Optical network 14 may include any number of OXCs 20 arranged in any suitable manner. In particular embodiments, links 22 of optical network 14 comprise full-duplex fiber links.

Topologies of IP network 12 and optical network 14 may differ in various embodiments. For example, some embodiments may include an IP network and an optical network having different sets of vertexes and edges. In the illustrated embodiment, each IP router 16 of IP network 12 is co-located with an OXC 20 of optical network 14. Networks 12 and 14 may also include any suitable collection and arrangement of elements supporting data transmission, such as data sources, internet service providers (ISPs), computer systems, routers, cables, data destinations and any other equipment used to communicate data.

In the illustrated embodiment, IP network 12 operates using multi-protocol label switching (MPLS) which communicates traffic, using label switched paths (LSPs), onto a variety of routes to avoid congestion or failures or to enable a particular class or level of service. IP network 12 may be operated by an IP service provider, and optical network 14 may be operated by an optical transport service provider. In particular embodiments, the IP service provider may be a customer of the optical transport service provider and may lease the lightpaths from the optical transport service provider to interconnect IP network routers.

In some cases, the fee for leasing lightpaths of an optical network for setting up IP links can be a significant portion of an internet service provider's operational expenditure (OPEX) which internet service providers typically attempt to minimize. To reduce the OPEX, an internet service provider may apply MPLS traffic engineering techniques in their network to make the best use of IP link capacity. In some cases however, traffic engineering techniques of internet service providers have a limited scope and efficiency because internet service providers may be unable to get on-demand lightpath service from an optical transport service provider.

In some situations, data traffic volume on an IP network may be cyclical with a large variation, for example, over a given 24-hour period. In order to meet quality of service requirements from customers and deal with changing mix of user populations and Internet applications, internet service providers may predict traffic growth and may provision network capacity based on the peak level of cyclical demand. Thus, traffic engineering techniques may focus on congestion handling in order to alleviate the capacity requirement for meeting peak traffic demand. In this scenario, however, network resources may be underutilized during off-peak periods.

Intelligent WDM equipment and generalized MPLS (GM-PLS) control plane technology have created opportunities for optical transport service providers to provide on-demand lightpath services to internet service providers. With such a service, an internet service provider can activate IP links on demand to meet changing traffic patterns instead of committing to a static and over-provisioned network topology. For an internet service provider, such development leads to an important shift of network operations. Instead of relying heavily on traffic prediction and static network design, an internet service provider can operate the network with flexible inventory of network capacity and use multi-layer traffic engineering (ML-TE) to add or reduce network capacity as needed.

Multi-layer traffic engineering may comprise traffic engineering tasks that are performed to activate or decommission IP links in order to achieve certain objectives under changing traffic demand. Particular embodiments of the present invention extend conventional traffic engineering applications that handle network congestion to provide a multi-layer traffic engineering framework having an objective of OPEX reduction for internet service providers while maintaining appropriate quality of service levels in order to meet the customer service level agreements. Such multiple levels include an IP network level and an optical network level.

In particular embodiments, on-demand lightpath services may be offered by optical transport service providers and there may be an adequate number of router ports available such that IP links may be activated and decommissioned on demand according to bandwidth requirements. The cost of router ports, a capital expenditure, is typically insignificant when compared to leasing cost of IP links, an operational expenditure. Thus, efficient management of IP links may be more critical and thus may comprise an objective of a multi-layer traffic engineering framework of particular embodiments. Particular embodiments in operation utilize a traffic engineering framework that attempts to maintain a balance between two cost factors—lightpath leasing cost and penalty due to a customer service level agreement violation.

Figure 2:
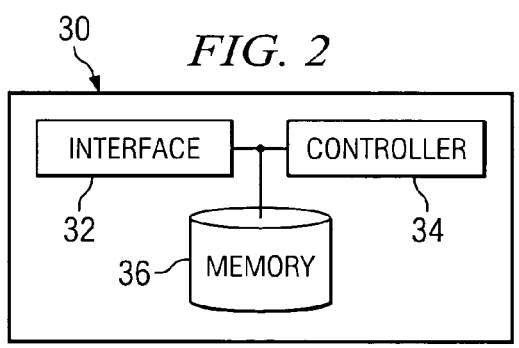
FIG. 2 illustrates a traffic manager for managing network traffic of the system of FIG. 1, in accordance with a particular embodiment of the present invention.

FIG. 2 illustrates a traffic manager 30 for managing network traffic of system 10 of FIG. 1, in accordance with a particular embodiment of the present invention. Traffic manager 30 may be operated by an internet service provider of IP network 12 and may be located at any suitable position or within any suitable component of system 10, such as within routers 16 of IP network 12. System 10 may include any number of traffic managers according to particular needs.

Traffic manager 30 includes an interface 32, a controller 34 and a memory 36. Interface 32 interfaces with components of system 10, including components of IP network 12 and optical network 14 to perform various traffic management tasks. Controller 34 performs various traffic management tasks, such as MPLS and route computation. In particular embodiments, controller 34 performs traffic management tasks further discussed below to avoid congestion, reduce operating costs and maintain certain service levels related to the communication of traffic through IP network 12. Controller 34 may be a microprocessor, controller or any other suitable computing device or resource and is adapted to execute various types of computer instructions in various computer languages for implementing functions available within system 10. Memory 36 may be any form of volatile or nonvolatile memory including, without limitation, magnetic media, optical media, random access memory (RAM), read only memory (ROM), removable media or any other suitable local or remote memory component. Memory 36 includes components, logic modules or software executable by processor 34, and components of memory 36 may be combined and/or divided for processing according to particular needs or desires within the scope of the present invention.

Figure 3:
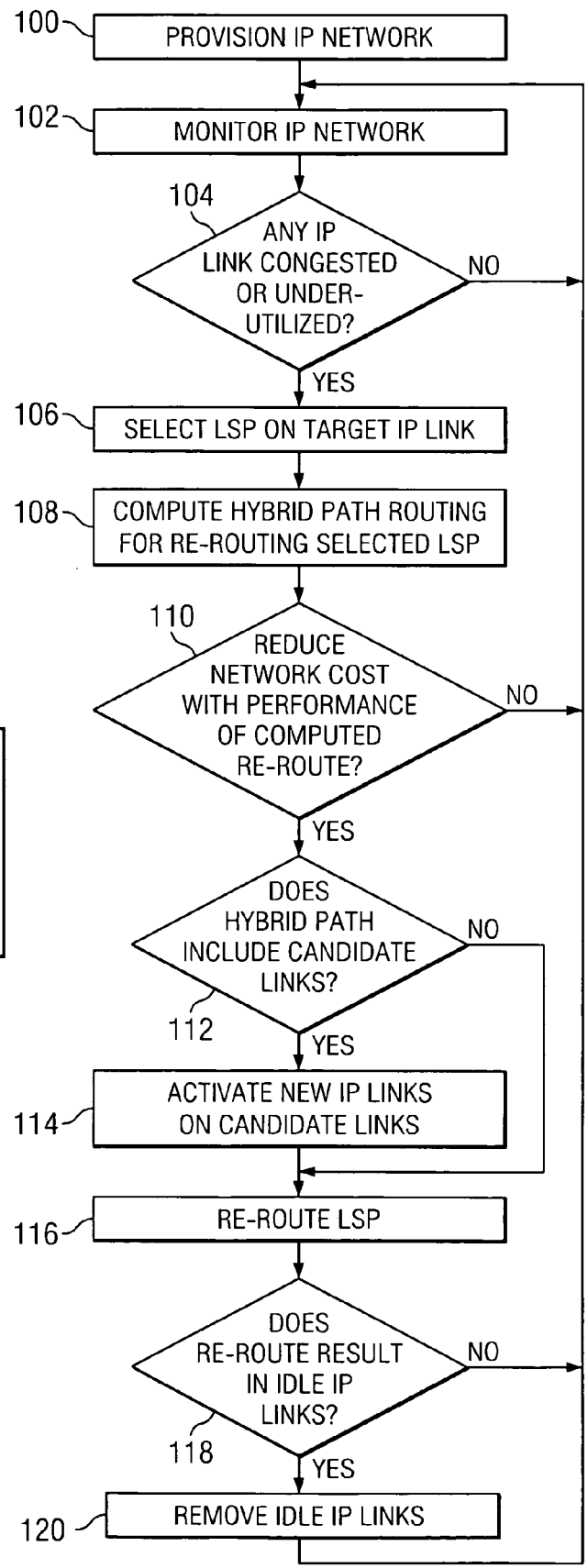
FIG. 3 is a flowchart illustrating a method for managing network traffic, in accordance with a particular embodiment of the present invention.

FIG. 3 is a flowchart illustrating a method for managing traffic of IP network 12, in accordance with a particular embodiment of the present invention. The method begins at step 100 where an IP network is initially provisioned. The initial provisioning for multi-layer traffic engineering includes the process of network planning and dimensioning. Given network information, such as a traffic matrix indicating traffic demand and network topology, network operators may determine LSP routing and placement of IP links. IP topology (e.g., IP links placement) and LSP routing changes over time as traffic demand changes. Thus, a simple provisioning scheme may be applied to determine initial IP topology and routing.

At step 102, the network is monitored to detect and respond to variations in traffic demands and changes in network status, such as link failure and congestion. At step 104, it is determined whether any of the IP links are congested or underutilized. Congestion may be determined by detecting a threshold level of utilization of an IP links. If an IP link is congested or underutilized, the method proceeds to step 106 where the intermediate LSR that makes the detection selects an LSP for re-route according to a selection algorithm. The intermediate LSR notifies the ingress LSR of the selected LSP.

In particular situations, traffic demand may increase and may surpass the capacity of the IP network such that MPLS traffic engineering is no longer effective in dealing with network congestion (because MPLS traffic engineering alone does not increase network capacity). As a result, particular embodiments utilize a hybrid path routing operation in which the new route of an LSP in consideration is computed on a union of existing IP topology and a WDM topology subset (e.g., a topology subset of optical network 14 of FIG. 1) disclosed by an optical transport service provider. The subset of the WDM topology may be referred to as transformed topology.

At step 108, the ingress LSR, or head node, computes hybrid path routing for re-routing the selected LSP. The result of the hybrid path route computation may consist of existing IP links and the links on the transformed topology. For example, a particular hybrid path route may include a combination of IP links 18 of IP network 12 of FIG. 1 and links 22 of optical network 14. These new links may be referred to as candidate links. If utilized, candidate links in the hybrid path may be set up in the WDM layer by means of optical traffic engineering and may be activated in the IP layer as newly added IP links. In some cases, a route from a hybrid path route computation may include only IP links 18 or only links 22 of optical network 14.

Each link of the computed hybrid path route is associated with a cost. The associated costs are summed to determine a cost for the entire path. At step 110, it is determined whether network cost would be reduced with the performance of this hybrid path route. If performance of the hybrid path route would reduce network cost, then the method proceeds to step 112 where it is determined whether the computed hybrid path route actually includes candidate links from the WDM layer. If candidate links from the WDM layer are included in the hybrid path route, the method proceeds to step 114 where new IP links are activated on those candidate links. If, at step 110, it is determined that the network cost is not reduced upon performance of the computed route, the method returns to step 102.

At step 116 the LSP is rerouted according to the calculated hybrid path route. Signaling is performed to switch the LSP from the old route to the new route, and the old route is torn down. At step 118 it is determined whether the reroute results in idle IP links. If so, the method proceeds to step 120 where the idle IP links are removed to reduce leasing costs.

Optical traffic engineering determines the actual route taken by each lightpath in correspondence to a request of setting up an IP link from an internet service provider. In the multi-layer traffic engineering framework disclosed herein, the layering relation remains between IP and WDM networks and as such, the multi-layer traffic engineering invokes the lightpath service provided by the optical transport service provider but may not be involved in the optical traffic engineering decisions. It is beneficial to this framework if the optical transport service provider is capable of establishing WDM lightpaths on an on-demand and incremental basis.

As indicated above, a particular algorithm may be performed to select a particular LSP for reroute. In particular embodiments, each link state router (LSR) monitors bandwidth utilization of its outgoing links. Such information may be added to the link state advertisement (LSA) of open shortest path first (OSPF) protocol and may be disseminated across the network. An extension of opaque LSA may carry the utilization information. In addition, bandwidth consumption (i.e., traffic volume) of each LSP is also monitored. In particular embodiments, use of this information may be limited to internal use by an intermediate LSR to decide which LSP should be re-routed in response to a traffic engineering event, such as link congestion.

The LSP selection is based on link utilization and LSP bandwidth consumption. A reroute request is sent to the ingress LSR. For stability of traffic engineering operation, the LSPs may be rerouted one at a time for those LSPs associated with the same traffic engineering event. Thus, the intermediate LSR may send out a new reroute request after the previous LSP reroute is completed or after a predefined period of time has elapsed, whichever occurs first.

The ingress LSR is responsible for rerouting data traffic of an LSP onto a new path. Upon receiving a reroute request, the ingress LSR calculates an alternative path for the LSP using the network link utilization information it received through the opaque LSA of OSPF. The new path needs to have sufficient bandwidth for the data traffic being rerouted, without causing congestion. If possible, the new path should also avoid the lightly utilized IP links in order to consolidate the traffic and lead to decommissioning of unused IP links. The ingress LSR uses standard RSVP traffic engineering protocol to set up a new LSP to transport the data traffic and then tears down the old LSP. In particular embodiments, no explicit confirmation may be sent back to the intermediate LSR that initiates the reroute.

When the IP network is operated under a static IP/MPLS topology, there may be little incentive to move traffic away from under-utilized links, as the resources (i.e., links) are statically provisioned and empty links cannot be decommissioned to reduce cost. However, if multi-layer traffic engineering can be applied and the IP links can be dynamically provisioned and decommissioned, it may be desirable to consolidate traffic should, and, if possible, to remove unused IP links to reduce lightpath leasing fees.

As indicated above, transformed topology refers to a subset of optical network 14 topology disclosed by an optical transport service provider to add additional capacity for traffic on the IP network. When an ingress LSR a fails to find an alternative path to reroute an LSP l as requested by a congested intermediate LSR, the available network resource is insufficient to meet the traffic demand. Assume the IP network topology is represented as a graph G(V,E), where V is the set of IP nodes and E is the set of existing IP links. Let $E_1$ be the set of remaining IP links after removing the IP links whose utilization is too high (i.e., congested) to carry the LSP l. Thus, $G(V,E_1)$ is not a connected graph, and there is no path from the ingress LSR a to an egress LSR z.

The graph $G(V,E_1)$ may be augmented to become connected again. A graph G $(V,E_2)$ is used to represent the subset of the WDM topology disclosed by the optical transport service provider. Each link in the set $E_2$ is a candidate link and is associated with the cost of using the corresponding lightpath in the WDM network, (i.e., the cost of leasing that lightpath). A resulting cost metric is denoted as $c(e) > 0$, $\forall e \in E_2$. In particular cases, the cost of new IP links between LSR m and LSR n may be assumed to be equal to hop-count of shortest path between an OXC m and an OXC n on the WDM topology, where LSR m and n are connected to OXC m and n, respectively.

The graph G $(V,E_2)$ may be referred to as the transformed topology of the WDM network. It provides IP layer the essential information about the lightpath offering from the optical transport service provider, but it shields the details of the actual WDM topology. The set of $E_2$ may not necessarily mimic the fiber links in WDM networks nor the existing IP links. The optical transport service provider and the internet service provider may negotiate the lightpath service that the internet service provider receives. The optical transport service provider may construct the transformed topology and associated cost in accordance with such negotiation. Particular embodiments may use different cost functions to determine the cost metric $c(e) > 0$, $\forall e \in E_2$.

As indicated above, particular embodiments utilize a hybrid path routing operation in which the new route of an LSP in consideration is computed on a union of existing IP topology and a WDM topology subset disclosed by an optical transport service provider. With the transformed topology, an internet service provider can augment existing IP topology with potential links that may be added to the IP network in response to a traffic engineering event.

The augmented graph $G(V,E_1+E_2)$ is expected to be a connected graph. With a specially-designed cost metric, the ingress node may use Dijkstra's algorithm to find a suitable path for LSP rerouting. The resultant path is a hybrid path as it consists of existing IP links (in $E_1$) and one or more links from the transformed topology (in $E_2$) that may not yet exist. The completion of LSP rerouting is performed with two additional steps. First, the lightpaths that correspond to the new IP links in the hybrid path are set up by the WDM layer. Second, the IP link needs to be activated before the LSP can be rerouted on the newly augmented IP topology. During the activation process, the IP routers at both ends of the new IP link allocate an unused port for the link and activate the ports with the established lightpath.

Particular embodiments may use a special cost function described below to work with the Dijkstra's algorithm. The design objective is to minimize the network cost in terms of the lightpath leasing cost. For ease of discussion, we consider both directions of an IP link separately. Utilization of an IP link, i, is denoted as $\vec{u}_i$ for the forward direction, and utilization in the reverse direction is denoted as $i \overleftarrow{u}_i$. If UH is the utilization threshold at which an IP link is considered to be congested, a utilization metric for a bi-directional IP link may be defined as:

$$u_i = \min(\vec{u}_i, UH) + \min(\overleftarrow{u}_i, UH), \forall i \in E_1 + E_2.$$

This represents how "full" the IP link i is being utilized in both directions. The links in the set of $(E-E_1)$ are excluded, as their utilization is too high to support the traffic of the LSP being rerouted. In addition, the utilization in both directions may be capped with UH, because the link may be considered "fully" utilized when the utilization exceeds UH. $I_i$ is a function indicating if a link is idle in both directions or not and $$I_i(u_i) = \begin{cases} 0, & \text{if } u_i = 0 \\ 1, & \text{otherwise} \end{cases}$$

The network cost, or the leasing cost for the entire network, can be defined as:

$$N_C(G(V, E)) = \sum_{i \in E_1 + E_2} C_i I_i(u_i)$$

where $C_i$ is the leasing cost of IP link i. Intuitively, this is the summation of the lightpath leasing fee for each non-idle IP link. If an IP link is idle in both directions, the link can be decommissioned and thus does not contribute to the network cost.

The cost functions described above ensure activation of only the smallest number of IP links that need to be activated, thus reducing the leasing cost. However, this definition may not be suitable for the purpose of selecting a good path for traffic consolidation and traffic engineering without involving candidate links, because change in link utilization does not reflect in $I_i$ unless the utilization becomes zero or is changed from zero. Thus, a continuous function $J_i$ is adopted to replace $I_i$. The shape of $J_i$ is depicted as:

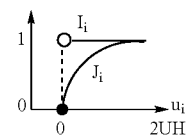

The new network cost becomes:

$$N_{CC}(G(V, E)) = \sum_{i \in E_1 + E_2} C_i J_i(u_i).$$

Similarly, the new network cost is totaled over the links being considered for hybrid path computation (i.e., $E_1 + E_2$). In order to apply the Dijkstra's algorithm, the link "distance metric" is assigned as the marginal link cost when an IP link carries the traffic of LSP in question. Specifically, the link "distance metric" is denoted as $D_i$:

$$D_i = C_i J_i(u'_i) - C_i J_i(u_i)$$

where $u'_i=\min(\vec{u}_i+b,UH)+\min(\vec{u}_i,UH)$ is the new cost of IP link i should it carry the amount of traffic, b, from the LSP being rerouted. With the "distance metric," a shortest-distance path is computed using Dijkstra's algorithm. The resulting path is used for the LSP rerouting as it bears two carefully designed properties. First, it reduces the cost of activating new IP links. Second, it consolidates the IP traffic by avoiding lightly utilized IP links.

Some of the steps illustrated in FIG. 3 may be combined, modified or deleted where appropriate, and additional steps may also be added to the flowchart. Additionally, steps may be performed in any suitable order without departing from the scope of the invention.

As indicated above, particular embodiments of the present invention overlay a WDM topology over an IP topology such that only a representative of the WDM topology is revealed to an internet service provider. Thus, when managing IP traffic, the internet service provider may not have to be concerned with details of the entire WDM topology or optical traffic engineering decisions. Instead, the internet service provider may only receive a topology indicating WDM links negotiated and available for use by an optical transport service provider. Accordingly, reroute calculation costs may be reduced. Particular embodiments also allow for dynamic network provisioning thus reducing the significance and weight placed upon initial network planning. In addition, revenue for optical transport service providers may be increased since particular embodiments allow optical transport service providers to accommodate more customers with the same amount of resources.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within IP and optical networks and a traffic manager, elements may be combined, rearranged or positioned in order to accommodate particular routing architectures or needs. In addition, any of these elements may be provided as separate external components where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for managing network traffic, comprising:
provisioning an internet protocol (IP) network for communicating traffic, the IP network operated by an IP service provider and comprising a plurality of nodes coupled by IP links activated in an IP layer and available for the routing of label switched paths (LSPs);
monitoring the IP network for a congestion event;
upon detecting a congestion event, selecting a LSP of the IP network for reroute;
receiving a transformed topology constructed by an optical transport service provider of a wavelength division multiplex (WDM) topology, the transformed topology comprising a subset of lightpaths of the WDM topology that are available for, but not currently activated in, the IP layer;
computing, based on the transformed topology, a hybrid path route for the selected LSP between a first node and a second node of the plurality of nodes, the hybrid path route comprising at least one IP link already activated in the IP layer and at least one lightpath of the WDM topology coupled to the IP network but not activated in the IP layer;
determining whether performance of the hybrid path route for the selected LSP reduces costs; and
if the hybrid path route reduces costs:
activating a new IP link on each of the at least one lightpaths of the WDM topology, the new IP link being added to the IP links available for the routing of LSPs; and
rerouting the selected LSP according to the hybrid path route.

2. The method of claim 1, further comprising decommissioning an idle IP link after rerouting the selected LSP.

3. The method of claim 1, wherein determining whether performance of the hybrid path route for the selected LSP reduces costs comprises accounting for a cost associated with each IP link and each lightpath of the hybrid path route.

4. The method of claim 1, wherein activating a new IP link on each of the at least one lightpaths of the WDM topology comprises:
allocating an unused router port on each end of each of the at least one lightpaths; and
activating the allocated router ports with respective established lightpaths.

5. The method of claim 1, wherein each of the plurality of nodes of the IP network comprises an IP router.

6. The method of claim 1, wherein each of the lightpaths of the WDM topology couples optical crossconnects of the WDM topology.

7. The method of claim 1, wherein computing a hybrid path route comprises computing a hybrid path route comprising at least one non-lightpath link and at least one lightpath of a WDM topology coupled to the IP network.

8. The method of claim 1, wherein the transformed topology shields at least one detail of the actual WDM topology.

9. The method of claim 1, wherein the cost is a leasing cost.

10. The method of claim 1:
further comprising:
computing an alternate path route for the selected LSP between the first node and the second node, the alternate path comprising IP links already activated in the IP layer and not comprising any lightpaths of the WDM topology coupled to the IP network but not activated in the IP layer; and
determining whether the performance of the alternate path for the selected LSP reduces costs,
wherein the hybrid path route for the selected LSP is computed upon determining that the performance of the alternate path route for the selected LSP does not reduce costs.

11. A system for managing network traffic, comprising:
an internet protocol (IP) network for communicating traffic, the IP network operated by an IP service provider and comprising a plurality of nodes coupled by IP links activated in an IP layer and available for the routing of label switched paths (LSPs);
a wavelength division multiplex (WDM) Topology coupled to the IP network, the WDM topology comprising a plurality of lightpaths operable to communicate optical traffic; and
a controller operable to:
provision the IP network for communicating traffic;

monitor the IP network for a congestion event;
upon detecting a congestion event, select a LSP of the IP network for reroute;
receive a transformed topology constructed by an optical transport service provider of a wavelength division multiplex (WDM) topology, the transformed topology comprising a subset of lightpaths of the WDM topology that are available for, but not currently activated in, the IP layer;
compute, based on the transformed topology, a hybrid path route for the selected LSP between a first node and a second node of the plurality of nodes, the hybrid path route comprising at least one of the IP links already activated in the IP layer and at least one lightpath of the plurality of lightpaths of the WDM topology coupled to the IP network but not activated in the IP layer;
determine whether performance of the hybrid path route for the selected LSP reduces costs; and
if the hybrid path route reduces costs:
activate a new IP link on each of the at least one lightpaths of the plurality of lightpaths of the WDM topology, the new IP link being added to the IP links available for the routing of LSPs; and
reroute the selected LSP according to the hybrid path route.

12. The system of claim 11, wherein the controller is further operable to decommission an idle IP link after rerouting the selected LSP.

13. The system of claim 11, wherein a controller operable to determine whether performance of the hybrid path route for the selected LSP reduces costs comprises a controller operable to account for a cost associated with each IP link and each lightpath of the hybrid path route.

14. The system of claim 11, wherein a controller operable to activate a new IP link on each of the at least one lightpaths of the plurality of lightpaths of the WDM topology comprises a controller operable to:
allocate an unused router port on each end of each of the at least one lightpaths; and
activate the allocated router ports with respective established lightpaths.

15. The system of claim 11, wherein each of the plurality of nodes of the IP network comprises an IP router.

16. The system of claim 11, wherein each of the plurality of lightpaths of the WDM topology couples optical crossconnects of the WDM topology.

17. Logic for managing network traffic, the logic encoded in computer readable media and operable when executed by a processor to:
provision an internet protocol (IP) network for communicating traffic, the IP network operated by an IP service provider and comprising a plurality of nodes coupled by IP links activated in an IP layer and available for the routing of label switched paths (LSPs);
monitor the IP network for a congestion event;
upon detecting a congestion event, select a LSP of the IP network for reroute;
receive a transformed topology constructed by an optical transport service provider of a wavelength division multiplex (WDM) topology, the transformed topology comprising a subset of lightpaths of the WDM topology that are available for, but not currently activated in, the IP layer;
compute, based on the transformed topology, a hybrid path route for the selected LSP between a first node and a second node of the plurality of nodes, the hybrid path route comprising at least one IP link already activated in the IP layer and at least one lightpath of the WDM topology coupled to the IP network but not activated in the IP layer;
determine whether performance of the hybrid path route for the selected LSP reduces costs; and
if the hybrid path route reduces costs:
activate a new IP link on each of the at least one lightpaths of the WDM topology, the new IP link being added to the IP links available for the routing of LSPs; and
reroute the selected LSP according to the hybrid path route.

18. The logic of claim 17, further operable when executed to decommission an idle IP link after rerouting the selected LSP.

19. The logic of claim 17, wherein logic operable when executed to determine whether performance of the hybrid path route for the selected LSP reduces costs comprises logic operable when executed to account for a cost associated with each IP link and each lightpath of the hybrid path route.

20. The logic of claim 17, wherein logic operable when executed to activate a new IP link on each of the at least one lightpaths of the WDM topology comprises logic operable when executed to:
allocate an unused router port on each end of each of the at least one lightpaths; and
activate the allocated router ports with respective established lightpaths.

21. The logic of claim 17, wherein each of the plurality of nodes of the IP network comprises an IP router.

22. The logic of claim 17, wherein each of the lightpaths of the WDM topology couples optical crossconnects of the WDM topology.

23. A system for managing network traffic, comprising:
means for provisioning an internet protocol (IP) network for communicating traffic, the IP network operated by an IP service provider and comprising a plurality of nodes coupled by IP links activated in an IP layer and available for the routing of label switched paths (LSPs);
means for provisioning an internet protocol (IP) network for communicating traffic, the IP network comprising a plurality of nodes coupled by IP links;
means for monitoring the IP network for a congestion event;
means for, upon detecting a congestion event, selecting a LSP of the IP network for reroute;
means for receiving a transformed topology constructed by an optical transport service provider of a wavelength division multiplex (WDM) topology, the transformed topology comprising a subset of lightpaths of the WDM topology that are available for, but not currently activated in, the IP layer;
means for computing, based on the transformed topology a hybrid path route for the selected LSP between a first node and a second node of the plurality of nodes, the hybrid path route comprising at least one IP link already activated in the IP layer and at least one lightpath of a the WDM topology coupled to the IP network but not activated in the IP layer;
means for determining whether performance of the hybrid path route for the selected LSP reduces costs; and
if the hybrid path route reduces costs:
means for activating a new IP link on each of the at least one lightpaths of the WDM topology, the new IP link being added to the IP links available for the routing of LSPs; and means for rerouting the selected LSP according to the hybrid path route.

24. The system of claim 23, further comprising means for decommissioning an idle IP link after rerouting the selected LSP.

25. The system of claim 23, wherein means for determining whether performance of the hybrid path route for the selected LSP reduces costs comprises means for accounting for a cost associated with each IP link and each lightpath of the hybrid path route.

26. The system of claim 23, wherein means for activating a new IP link on each of the at least one lightpaths of the WDM topology comprises:
   means for allocating an unused router port on each end of each of the at least one lightpaths; and
   means for activating the allocated router ports with respective established lightpaths.

27. The system of claim 23, wherein each of the plurality of nodes of the IP network comprises an IP router.

28. The method of claim 23, wherein each of the lightpaths of the WDM topology couples optical crossconnects of the WDM topology.

29. A method for managing network traffic, comprising:
   provisioning an internet protocol (IP) network for communicating traffic, the IP network operated by an IP service provider and comprising a plurality of nodes coupled by IP links activated in an IP layer and available for the routing of label switched paths (LSPs), each of the plurality of nodes comprising an IP router;
   monitoring the IP network for a congestion event;
   upon detecting a congestion event, selecting a LSP of the IP network for reroute;
   receiving a transformed topology constructed by an optical transport service provider of a wavelength division multiplex (WDM) Topology, the transformed topology comprising a subset of available lightpaths of the WDM topology, each lightpath of the WDM topology coupling optical crossconnects of the WDM topology but not currently activated in the IP layer;
   computing, based on the transformed topology, a hybrid path route for the selected LSP between a first node and a second node of the plurality of nodes, the hybrid path route comprising at least one IP link already activated in the IP layer and at least one lightpath of the WDM topology coupled to the IP network but not activated in the IP layer;
   determining whether performance of the hybrid path route for the selected LSP reduces costs;
   if the hybrid path route reduces costs:
      activating a new IP link on each of the at least one lightpaths of the WDM topology, the new IP link being added to the IP links available for the routing of LSPs; and
      rerouting the selected LSP according to the hybrid path route; and
   decommissioning an idle IP link after rerouting the selected LSP.

* * * * *

UNITED STATES PATENT AND TRADEMARK OFFICE
CERTIFICATE OF CORRECTION

PATENT NO. : 7,725,035 B2  
APPLICATION NO. : 10/828570  
DATED : May 25, 2010  
INVENTOR(S) : Hung-ying Tyan et al.

Page 1 of 1

It is certified that error appears in the above-identified patent and that said Letters Patent is hereby corrected as shown below:

On Title Page 2, Other Publications, Line 5 after "*GMPLS-Router Networks*," delete "IEIECE" and insert -- IEICE --.

In the Specifications

Column 8, Line 1 after "is denoted as i" delete " $\vec{u}_i$ " and insert -- $\overleftarrow{u}_i$ --.

Column 8, Line 6 after "+min" delete " $(\vec{u}_i, UH)$ " and insert -- $(\overleftarrow{u}_i, UH)$ --.

Column 9, Line 1 after "+min" delete " $(\vec{u}_i, UH)$ " and insert -- $(\overleftarrow{u}_i, UH)$ --.

In the Claims

Column 10, Line 41 after "wherein the cost is a" delete "leasing" and insert -- monetary --.

Signed and Sealed this  
Twenty-sixth Day of November, 2013

Margaret A. Focarino  
*Commissioner for Patents of the United States Patent and Trademark Office*